INVENTOR.
ROMALD E. BOWLES

June 28, 1966 R. E. BOWLES 3,258,023
PNEUMATIC EYE
Filed April 12, 1963 4 Sheets-Sheet 2

INVENTOR.
ROMALD E. BOWLES
BY
Hurvitz + Rose

June 28, 1966  R. E. BOWLES  3,258,023
PNEUMATIC EYE
Filed April 12, 1963  4 Sheets-Sheet 3

INVENTOR.
ROMALD E. BOWLES
BY
Hurvitz + Rose

June 28, 1966 R. E. BOWLES 3,258,023
PNEUMATIC EYE
Filed April 12, 1963 4 Sheets-Sheet 4

INVENTOR.
RONALD E. BOWLES
BY
Harvitz + Rose

United States Patent Office 3,258,023
Patented June 28, 1966

3,258,023
PNEUMATIC EYE
Romald E. Bowles, 12712 Meadowood Drive,
Silver Spring, Md.
Filed Apr. 12, 1963, Ser. No. 272,650
18 Claims. (Cl. 137—81.5)

The present invention relates to object detection apparatus and, more particularly, to a pure fluid system for detecting the presence or absence of an object or body.

Object detection apparatus is widely employed in the control and measuring arts for counting objects, detecting the presence of an object within a monitored area or displacement, determining the dimension of an object, or for determining related phenomena. To date, detection of objects has been accomplished in the prior art by mechanical feelers, photoelectric eyes, mechanical switching devices, etc. none of which are compatible with the recent developments in pure fluid systems. Each of these types of devices may be made compatible with a pure fluid system by the utilization of appropriate transducers. For instance, in the case of an electric eye, an electrical signal may be converted to valve action or, in the case of a mechanical system, the vane of a flapper valve or related device may be employed as a transducer. Electro-mechanical converters are relatively expensive while valve-type conversion devices are relatively slow in operation and wasteful of pressurized fluid.

It is an object of the present invention to provide a pure fluid object sensing apparatus utilizing moving streams of fluid which permit direct coupling into pure fluid systems thereby to eliminate the prior art requirements for transducers or relatively slow mechanical conversion systems.

It is another object of the present invention to provide a pure fluid system for detecting the passage of an object past a predetermined location which system may be employed readily in counting or control-type operations.

It is another object of this invention to provide a pure fluid system for detecting the presence or absence of a body in a given region and for producing a fluid output signal indicative of this condition.

It is still another object of the present invention to provide a pure fluid object detection system which determines the location of a body within prescribed limits.

Another object of the present invention is to provide a pure fluid system for determining the distance of an object relative to another object.

Yet another object of the present invention is to provide a pure fluid system for determining the dimensions of a body within minimum and maximum limits.

A further object of the present invention is to provide an object detection or position or approach sensing apparatus employing a stream of fluid diverted or otherwise deflected as a function of the presence, absence or position of an object or body under observation and to provide further a pure fluid apparatus having a pair of output channels, the fluid flows through which are varied as a function of presence or absence of the aforesaid stream of fluid at a sensing passage of the pure fluid apparatus.

The above and still further objects, features and advantages of the present invention will become apparent upon consideration of the following detailed description of several specific embodiments thereof, especially when taken in conjunction with the accompanying drawings, wherein.

Figure 1:
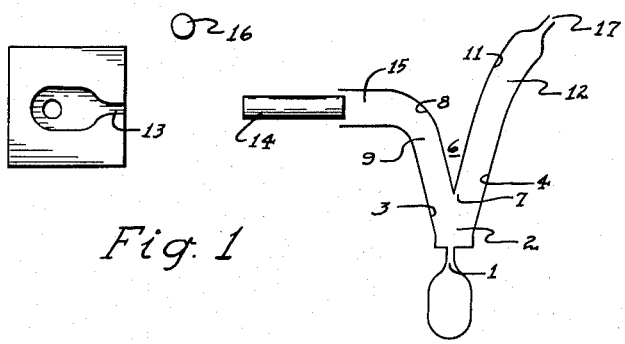
FIGURE 1 is a schematic diagram of a first embodiment of a pneumatic detection device of the invention.

Referring now specifically to FIGURE 1 of the accompanying drawings, there is illustrated a pure fluid apparatus employed primarily in a counting-type of operation although it is not restricted thereto. Fluid under pressure is supplied to a nozzle 1 for issuing fluid into a region 2 bounded by left and right sidewalls 3 and 4, respectively. A divider 6 is located downstream of a nozzle 1 and has an apex 7 located somewhat to the right of the centerline of the nozzle 1. The left sidewall 3 and a left sidewall 8 of the divider 6 form a fluid passage 9 while the right sidewall 4 and a right sidewall 11 of the divider 6 form a right outlet passage 12. Due to the location of the apex 7 of the divider 6 to the right of the centerline of the nozzle 1 and/or the location of the left sidewall 3 closer to the centerline of the nozzle than the right sidewall 4 or any combination of one or more of these factors, fluid supplied to the nozzle 1 normally exits from the device through the passage 9. The passage 9 terminates at a region 15 such that the passage at this point is generally symmetrical with the centerline of a further nozzle 13. The nozzle 13 is adapted to be connected to a source of fluid under a somewhat greater pressure than the source to which the nozzle 1 is connected. Located along the centerline of the nozzle 13 is a hollow tube 14 extending from the region 15 interiorly of the passage 9 toward the nozzle 13 and adapted to direct fluid from the nozzle 13 to the region 15. The pipe 14 insures that the fluid passing therethrough is introduced into the passage 9 so as to introduce a load into the device adequate to produce switching. More specifically, tube 14 is a self-matching device which, by causing the flow through tube 14 to reverse itself (in order to exit from passageway 15) into an approximately equal new exit area (the area around tube 14 in passage 9), develops maximum total pressure in passageway 15.

Under normal circumstances, and for instance, prior to the supply of fluid to the nozzle 13, fluid from the nozzle 1 issues through the passage 9 to the surrounding atmosphere. Upon application of fluid under pressure to the nozzle 13 and issuance of fluid thereby, a portion of this fluid is directed through the pipe 14 to the region 15 of the passage 9. The apparatus is proportioned, by preselection of the relative pressures supplied to the nozzles 1 and 13, the load to which the passage 12 is connected, and the design of the interaction region 2, such that there is a small net flow of fluid through the passage 9 toward the tube or hollow cylinder 14 in the presence of the fluid stream from nozzle 13. More particularly, the back loading provided by the load device 17 is such that all of the fluid supplied by the nozzle 1 cannot exit through the passage 12 and a portion of the fluid is caused to flow through the passage 9 in spite of the pressure developed at the location 15 by the fluid from the nozzle 13. This is an important feature of the invention since it prevents the intake of dirt and moisture through the passage 9 into the device which might otherwise impair its operating characteristics.

Upon interruption of the fluid from nozzle 13 as by means of an object 16 becoming located between the nozzle 13 and pipe 14, the pressure at the location 15 is greatly reduced and, further due to the asymmetry of the sidewalls 3 and 4 or the apex 7 of the divider 6, or both, all of the fluid issued by the nozzle 1 egresses through the channel 9. Upon re-establishment of flow from nozzle 13 through pipe 14, the device re-establishes flow to and through channel 12, with only a small portion of fluid exiting through channel 9. If a flow-responsive device is connected to the passage 12, the sudden termination of fluid flow may readily be detected. The sensing device may be another fluid device with the nozzle 17 comprising an input nozzle thereto. For instance, if the apparatus is to be employed as an object counter the nozzle 17 may comprise an input nozzle to a fluid pulse converter of the type disclosed in Warren Patent No. 3,001,698, issued on September 26, 1961. The nozzle 17 may also be the control nozzle of a fluid flip-flop or unistable device employed to drive a further mechanism, this type of arrangement being employed to provide for further amplification in the system. Of course, the load may be a mechanical or electrical load.

As previously indicated, the ability to maintain a flow outward from the passage 9 in spite of the switching of the fluid stream to the outlet passage 12 is a function of many parameters of the system. It has been found, however, that with a size of nozzle 13 of approximately .02" x .18", a tube 14 with an inside diameter of .1", pressure supplied to the nozzle 13 of 5 p.s.i., pressure of 1 p.s.i. supplied to the nozzle 1 and with the distance between the nozzle 13 and the tube 14 between .65" and .85", the desired operation is obtained.

The apparatus of FIGURE 1 is somewhat limited in applicability due to the limited distance available between the nozzle 13 and the pipe 14. This distance can be increased by means of increasing pressure to the nozzle 13, and by other design variations but in all events, the distance is somewhat limited thereby limiting the size of objects which may be detected. If it is desired to employ the apparatus in a location where the spacing available for sensing must be considerably greater than available with the apparatus of FIGURE 1, the apparatus of FIGURE 2 may be utilized.

Figure 2:
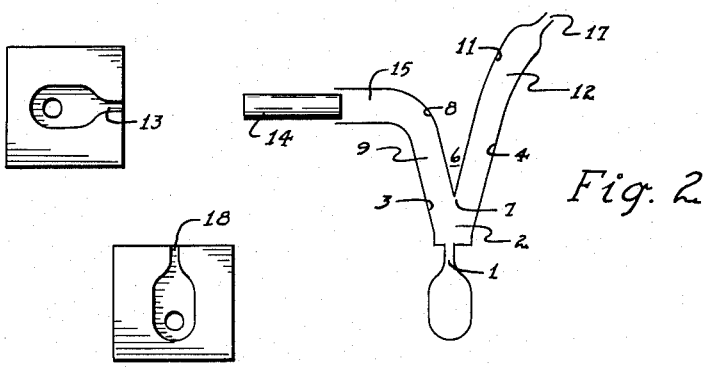
FIGURE 2 is a schematic diagram of a second embodiment of the detection apparatus.

The device of FIGURE 2 is identical in most respects with that of FIGURE 1 and therefore the same reference numerals are applied thereto. An additional nozzle 18 is provided in FIGURE 2 for directing a stream of fluid at right angles to and in intercepting relationship with the stream issued by the nozzle 13. It is the function of the nozzle 18 to interrupt the stream issued by the nozzle 13 so that the flow from the nozzle 1 is normally directed out of the passage 9. If a body interrupts the stream from the nozzle 18, the flow from nozzle 13 is re-established through tube 14 and fluid flows from the nozzle 1 through the outlet channel 12. It is seen that in this system the operation is the reverse of that of FIGURE 1 in that, normally, fluid flow is out of the channel 9 and is directed to the channel 12 only when an object is detected. In FIGURE 1, the flow is normally out of the channel 12 and flows out the channel 9 only when an object is detected. The use of the additional nozzle 18, which may be connected to a still higher pressure than the nozzle 13, is to permit greater spacing in the sensing region since a relatively critical balance of parameters as between flows from nozzles 13 and 18 is not required. In the apparatus of FIGURE 2, it is only necessary that the flow from the nozzle 18 deflect the flow from the nozzle 13 and the degree of deflection and/or degree of continuity of deflected stream 13 is quite unimportant. Thus, the nozzle 18 may be withdrawn a relatively large distance from the centerline of nozzle 13-pipe 14 without adversely affecting operation of the system.

Figure 3:
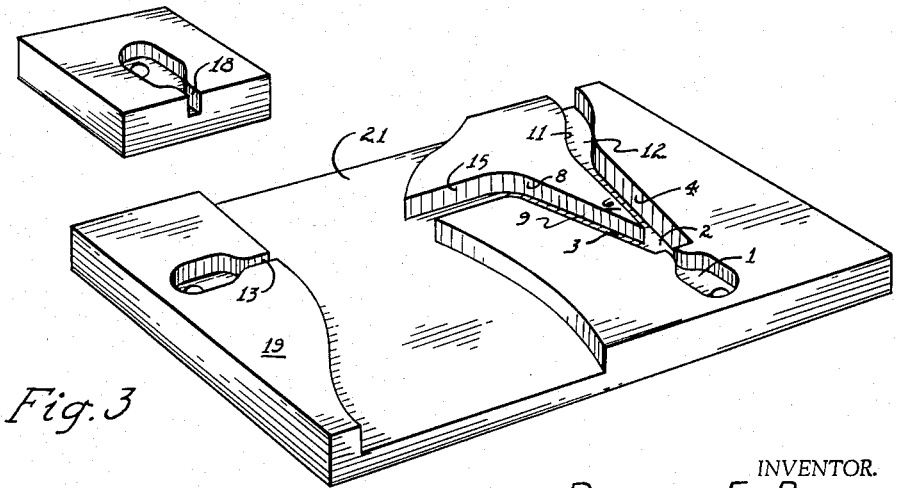
FIGURE 3 is a perspective view of the physical structure of the device of FIGURE 2, slightly modified.

The operation of the system of FIGURE 2 may be even further improved by employing a form of the apparatus of FIGURE 2 as illustrated in FIGURE 3. In the latter figure, the tube 14 is eliminated for purposes to be described. In FIGURE 3, the apparatus, except for the nozzle 18, is formed as channels in a solid block 19. The block 19 normally has a cover plate provided for its top surface so as to confine fluid flow to the channels formed in the block 19. The cover plate is eliminated from the figure for purposes of clarity. In consequence of this arrangement, the stream issued by the nozzle 13 is confined at its lower and upper edge and therefore retains its continuity and identity over a considerably greater distance than would otherwise be possible in a submerged stream. It is the result of this construction that the tube 14 may be eliminated in this arrangement. If, however, it is wished to increase the distance between nozzle 13 and passage 9, a passage corresponding to pipe 14 may be employed.

The secondary nozzle 18 is placed outside of the block and directs its fluid into the region between the cover plate and the bottom of a channel 21 located between the nozzle 13 and channel 9. The channel 21 provides for passage of the stream issued by the nozzle 18 through the device formed in the block 19. Due to the confinement of the stream issued by the nozzle 18, or more particularly, the confinement of both streams in the region at which they intersect, a true momentum interchange occurs between the two streams and efficient deflection of the stream issued by the nozzle 13 is effected. In consequence, the pressure of fluids supplied to the nozzles 13 and 18 may be less than in the free jet system illustrated in FIGURE 2.

Figure 4:
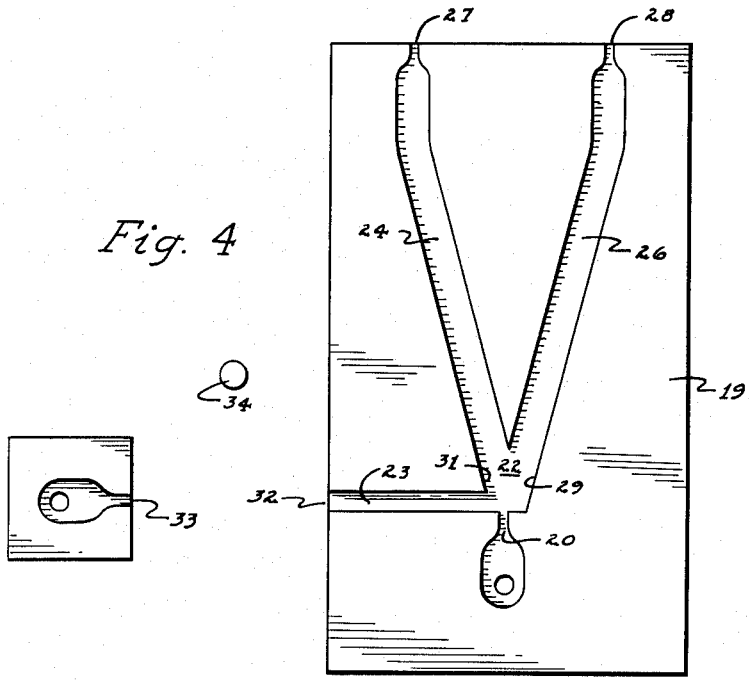
FIGURE 4 is a schematic diagram of a still further embodiment of a pneumatic object detection device.

Referring now specifically to FIGURE 4 of the accompanying drawings, there is illustrated a pneumatic detection system of the general type illustrated in FIGURES 1 through 3 in which, however, a control signal is applied to a control passage of a pure fluid amplifier rather than to an output passage thereof. The fluid amplifier may be formed in a block as channels therein, the block normally having a cover plate applied thereto so as to provide an upper or top surface for the various channels. The device is provided with a power nozzle 20 for issuing fluid into an interaction region 22. Communicating with the interaction region 22 is a control passage 23 and two outlet passages 24 and 26. The passages 24 and 26 terminate in restrictions 27 and 28, respectively, so as to back load the device to provide an internal static pressure greater than the ambient pressure about the device. In consequence, the internal pressure in the interaction region 22 causes fluid to flow outwardly through the passage 23 into the ambient region regardless of the outlet passage to which fluid is flowing. In the arrangement illustrated, a fluid stream is normally directed toward the control passage 23 from a nozzle arrangement 33.

Fluid issuing from the nozzle 20 normally flows to the passage 24 due to the formation of a low pressure region at the left sidewall 31. The low pressure region results from communication between this region and the lower pressure ambient region through passage 23. The pressure thus developed in region 31 is lower than the pressure on the other side of the stream so that a differential in pressure is created across the stream issued by the nozzle 20 and maintains the stream against the wall 31. It must be remembered that although the low pressure at the wall 31 is at a pressure which is lower than the pressure in the remaining part of the region 22, it is still somewhat higher than the ambient pressure so that air exhausts to the exterior of the system.

If fluid is now directed against the egress orifice 32 of the control channel 23 by means of the further nozzle 33, the rate of egress of fluid through the channel 23 is materially reduced although it is still sustained. The reduction in flow through the channel 23 causes a rise in pressure along the sidewall 31.

The sidewall 31 is set back from the power nozzle 20 by a greater distance than right sidewall 29, so that entrainment of fluid along the right side of the stream is more efficient in reducing pressure than along the left side of the stream. Thus, upon reduction of fluid flow through the channel 23, the pressure on the right side of the stream becomes less than on the left side thereof. The stream now attaches to the right sidewall 29 and flows to the outlet passage 26. As soon as the flow of fluid against the egress orifice 32 is removed, the pressure on the left side of the stream is reduced sufficiently to cause the stream to switch back to the output channel 24. The stream issued by the nozzle 33 may be interrupted by an object to be detected such as an object 34 which is moved through the stream. When this occurs, the pressure in channel 23 drops and the stream from the nozzle 20 is deflected by boundary layer effects to the passage 24. When the object has been removed from the path of the stream issued by the nozzle 33, the stream issued by the nozzle 20 is redirected to the passage 26. If a sensing device is placed at the output of the channel 24, a pulse of fluid is detected each time a body moves through a stream provided by the nozzle 33. The output signal developed in channel 24 may be of any of the types aforementioned such as counters, pulse rate meters, control devices, etc.

It will be seen that a conventional flip-flop device may be substituted for the device illustrated in FIGURE 4 with a reset pulse being applied to a right control nozzle.

Figure 5:
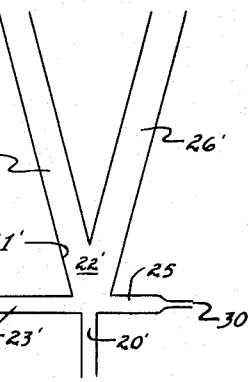
FIGURES 5 and 6 illustrate distinct modifications of the interaction region of the fluid amplifier employed in FIGURE 4 which modifications provide alternative arrangements for producing a desired switching.

The apparatus of FIGURE 4 is merely one form of apparatus employing control of egress of fluid through a control passage to effect switching in the environment illustrated. Referring specifically to FIGURE 5, there is illustrated an apparatus which employs two fluid bleeds and a set back left sidewall to effect control. Where there is a correspondence between elements, the numerals employed in FIGURE 5 correspond with those in FIGURE 4 but employ primes.

The interaction region 22' of the apparatus of FIGURE 5 is the same as in FIGURE 4 except that a right control passage 25 is let in through the right sidewall of the device adjacent the power nozzle 20'. The control passage 25 terminates in a constriction or nozzle 30 which restricts the egress of fluid therethrough. In the absence of a fluid stream being directed against the control passage 23', as by a nozzle 33 of FIGURE 4, egress of fluid through the passage 23' is more rapid than through the control passage 25 and the stream issued by nozzle 20' is diverted to the output passage 24'. Upon the issuance of fluid, as by nozzle 33 of FIGURE 4, against the outer end of the control channel 23', egress of fluid through this passage may be made less than through passage 25 raising the pressure on the left side of the stream to a value higher than on the right side of the stream thereby switching the stream to the right.

Figure 6:
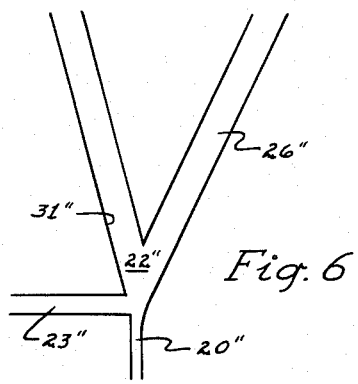

The same results may be obtained with the apparatus illustrated in FIGURE 6 which again is basically the same as that illustrated in FIGURE 4 except for changes in the interaction region. The reference numerals employed in FIGURE 6 are the same as in FIGURE 4 but bear double primes. In this modification, the sidewalls are symmetrical with respect to the centerline of the nozzle 20" but the divider is asymmetrical relative thereto. Normally, fluid exits through the outlet channel 26" since the apex of the divider is to the left, as illustrated in FIGURE 6, of the centerline of the nozzle 20". However, when fluid is free to pass outwardly through the control passage 23", the pressure on that side of the stream is sufficiently low relative to the ambient pressure in the interaction region 22" to cause the stream to be switched to the left. When egress of fluid through the passage 23" is sufficiently impeded, the pressure on the left side of the stream rises above the ambient or static pressure in the interaction region 22" and the stream switches to the right and therefore, to the outlet channel 26'.

Figure 7:
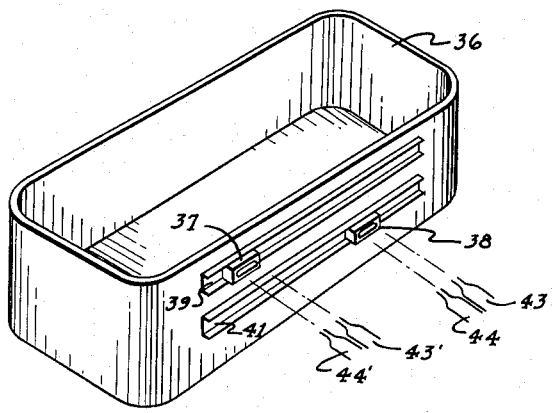
FIGURE 7 is a perspective view of a tote box with fluid reflectors in place, which reflectors are employed in the apparatus of FIGURES 8 and 9 to control routing of the tote box in a conveyor system.
Figure 8:
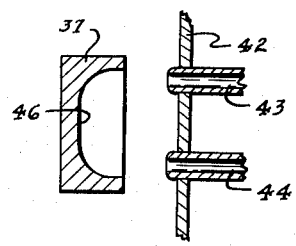
FIGURE 8 is a sectional view of a portion of the apparatus illustrated in FIGURE 7.
Figure 9:
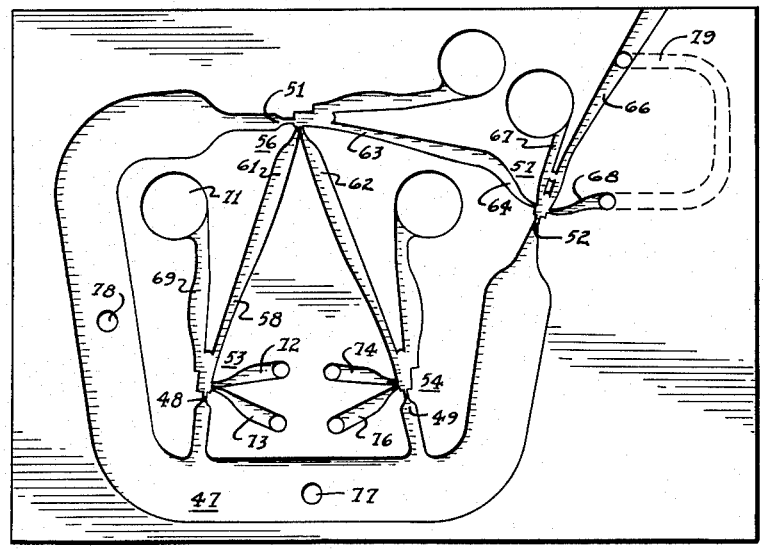
FIGURE 9 is a schematic diagram of a pneumatic logic circuit for controlling routing of a tote box in accordance with information carried thereon in the form of the positions of the reflectors illustrated in FIGURE 7.

Referring now specifically to FIGURES 7 through 9 of the accompanying drawings, there are illustrated portions of a conveyer dispatching system employing the pneumatic eye of the present invention. Referring specifically to FIGURE 7, the conveyor is intended to control the dispatch of a tote box generally designated by the reference numeral 36. The tote box 36 carries, in this example, two fluid diverters or reflectors 37 and 38 which are illustrated in greater detail in FIGURE 8. The fluid diverters 37 and 38 are movable along tracks 39 and 41, respectively, so that they may assume different positions which, as will be indicated subsequently, determine the ultimate destination of the tote box 36.

Referring to FIGURE 8 for the moment, a pair of fluid conduits 43 and 44 are mounted in a plate 42. Air under pressure is supplied to the conduit 43 and issues as a stream into the region to the left of the plate 42. If the air stream engages a properly positioned fluid diverter 37, the stream of air issued from the conduit 43 is turned through an appropriate angle, 180° being illustrated, and is directed to the fluid conduit 44. It will be noted that the diverter 37 has formed therein a curved channel 46 lying in the same plane as the conduits 43 and 44. The shape of the channel 46 is such, in FIGURE 8, that the fluid is turned through 180° but the incoming and outgoing streams are separated so that they do not interfere with one another. Also, the two streams are separated by the same distance as the conduits 43 and 44. Thus, whenever one of the diverters, such as diverter 37 passes a set of nozzles, such as nozzles 43 and 44, fluid from the nozzle 43 is directed toward the nozzle 44. At each given station at which a tote box 36 may be sensed, and diverted if properly coded, there may be provided two conduit arrangements such as arrangements 43 and 44. If the two diverters 37 and 38 are positioned on the side of the tote box 36 such that conduits 44 and 44' (see FIGURE 7) of the two sets of conduits receive fluid at the same time, the tote box is diverted at this location or, if normally divered at this location, is not diverted at this location. If, on the other hand, only one of the conduits 44 or 44' receives a signal or both receive signals but at different times, then the system is unaffected.

As previously indicated, the diverters 37 and 38 are movable along their respective tracks 39 and 41. The arrangement of tubes 43 and 44, and 43' and 44' is fixed at each diverter location and is different for each. Thus, the positions of the diverters 37 and 38 select the diverter location at which the tote box is deflected (or not deflected) since only one diverter station has a corresponding spacing between the various sets of conduits 43–44 and 43'–44'. Various arrangements of one or more reflector and conduit pairs may be employed. Specifically, only one reflector may be employed with its vertical position providing selection. The reflectors and conduits may be arranged perpendicular to the path of travel; i.e. vertically, at any other selected angle.

Each of the conduit pairs 43–44 may be employed with a system such as illustrated in FIGURE 1. In this case, the nozzle 13 would direct a stream of fluid parallel to but away from the tube 14. The stream thus issued, when encountering one of the deflectors 37 or 38 is redirected to the tube 14 to cause the device illustrated in FIGURE 1 to switch its stable state. Alternatively, the system as illustrated in FIGURE 7 may be employed with the system of FIGURE 4. The fluid stream may be derived from the supply to the channel 20 to apply fluid to a nozzle directing fluid out of the left side of the block 19 parallel to the axis of the channel 23. Upon reflection the stream impinges upon entrance 32 of channel 23 and causes the fluid stream to switch to passage 26. Flow to passage 26 passes through the nozzle 28, and is applied as an input to a mechanical system or may be applied as an input signal to an apparatus such as illustrated in FIGURE 9.

Referring specifically to FIGURE 9, there is illustrated an example of a fluid logic circuit for utilizing the signals derived from the apparatus illustrated in FIGURE 7. The apparatus is provided with a pressure supply channel or manifold 47 which supplies fluid under pressure to main power nozzles 48, 49 and 51, of gates 53, 54 and 56 and power nozzle 52 of flip-flop 57. Normally, fluid supplied to the orifice 48 flows to a right output channel 58 of gate 53 and fluid supplied to the power nozzle 49 flows to a left output channel 59 of the gate 54. The output channels 58 and 59 are connected to input control nozzles 61 and 62, respectively, of the NOR gate 56. Fluid from the power nozzle 51 of NOR gate 56, in the absence of control signals, flows to an output channel 63 which is connected to a control orifice 64 of the flip-flop 57. Fluid from the power nozzle 52 of the flip-flop 57 flows to either a right output channel 66 or a left output channel 67 depending upon which of control orifices 64 or 68 had the last fluid signal applied thereto.

Left control channel 69 of the gate 53 flows to an atmospheric dump 71, each of the circles in FIGURE 9 such as that designated by the numeral 71 being dumps to the atmosphere or other fixed reference pressure if the system is a closed system. The gate 53 is provided with control nozzles 72 and 73 while gate 54 is provided with control nozzles 74 and 76. Fluid under pressure is supplied to the manifold 47 via an orifice 77 adapted to be connected to a suitable source of pressurized fluid and fluid under pressure may be extracted from the manifold 78, if so desired, via an orifice 78 which may be connected to power nozzles 43 and 43' of the apparatus of FIGURE 7. The receptor nozzles 44 and 44' may be connected directly, or via suitable amplifiers, such as that illustrated in FIGURES 1-4, to control passages 72 and 74, respectively, of the gates 53 and 54.

Under normal circumstances, the fluid from the main power nozzles 48 and 49 flow through output channels 58 and 59, respectively, and cause the stream issued from the main power orifice 51 of the NOR unit 56 to be diverted to its upper outlet passage and thus to dump to the atmosphere or a reference pressure. Fluid from the main power nozzle 52 of flip-flop 57 on start up is initially set to flow through outlet passage 67. The output passage 66 of the flip-flop 57 is connected to a load device which may be a pilot valve for controlling a diverter of an automatically controlled conveyor system. Flow to passage 66 may either place a diverter in the path of the tote box or withdraw it from the path of the tote box as desired. If, for instance, the nozzle 44' only detects a fluid signal reflected from the reflector 37, fluid is supplied to the control nozzle 74 of the gate 54 and the fluid issuing from the main power nozzle 49 is diverted to the right output channel and is dumped. If the control nozzle 72 does not receive a fluid signal, concurrently, then the fluid from the main power nozzle 48 of the gate 53 remains diverted to the right output channel 58 and deflects the power stream issued by the nozzle 51 so that the fluid from this nozzle continues to be diverted to the atmosphere or other ambient pressure region. The operation of the system is the same if only the power nozzle 72 receives fluid and the nozzle 74 does not. However, if both of the nozzles 72 and 74 receive fluid concurrently, this meaning that the deflectors 37 and 38 reflect fluid to both receptors 44' and 44 concurrently, then no fluid flows to either nozzle 61 or 62 and boundary layer effects in the NOR gate 56 cause the stream issued by the nozzle 51 to be deflected to the outlet channel 63. Fluid is now supplied to the control nozzle 64 of the flip-flop 57. Fluid from the power nozzle 52 of flip-flop 57 is diverted to the output passage 66 and operates an appropriate load. At the same time fluid is supplied via a delay line 79, indicated by dashed lines, so as to apply a signal to the control nozzle 68 of the flip-flop 57 after a predetermined delay. The delay of the delay line 79 must be sufficient to permit the sensed tote box to be moved from the conveyor before applying the reset signal to the control nozzle 68. Flow of fluid from the control nozzle 68 causes the fluid stream from the power nozzle 52 to again be deflected to the output channel 67 rendering the unit available for a next succeeding operation.

Units 53 and 54 have been disclosed as NOR gates in that fluid signals supplied to only one control nozzle is sufficient to deflect the stream issued by the respective power nozzles to the ambient dump. By a small redesign of the system which involves, for instance, relocation of the sidewalls relative to the reaction regions and control nozzle size reduction, the units 53 and 54 may be converted into twin NOR gates wherein fluid from two input nozzles, such as nozzles 72 and 73, are required concurrently to produce switching of the fluid issued by the nozzle 48 of the unit 53. Of course, repetitive NOR logic may also be employed, this arrangement requiring four distinct NOR gates. Under these circumstances, four deflectors may be employed in the tote box selection and the power stream of the unit 53 is switched to the output channel 69 only if signals are received at both nozzles 72 and 73 and the unit 54 has its power stream switched to the ambient dump only if the fluid signals are applied to the control nozzles 74 and 76. If a binary, decimal or other type of code is to be employed, then inhibit gates may be required in the logic, the logic for such operations being well known in the art.

The devices of FIGURES 7 and 8, may also be employed to indicate the approach of an object to a fixed or other movable object. Thus, a deflector or diverter 37 may be mounted on the end of a tote box. As the tote box approaches the plate 42, the effectiveness of the reflected fluid stream increases as the distance between the plate 42 and the box decreases. The reflected signal will, when the tote box has reached a predetermined distance from the plate, be sufficient to trigger the fluid device, whether it be the type of FIGURES 1, 4, 5, 6 or 9. The output signal thus produced may be employed to stop the tote box or initiate whatever action is desired. The criticality of the distance between the approaching object and the plate 42, may be further enhanced by causing the fluid stream issuing from a diverter, such as diverter 37 to have a direction other than parallel to the stream issued by the conduit 43, so that the reflected stream impinges upon the conduit 44 only at a specific position in its path of movement. The same result of detecting distance from an object may be obtained from the systems of FIGURES 1-4. As previously indicated, each of these systems is sensitive to distance between the high pressure nozzle, such as nozzle 13 of FIGURE 1, and the detecting passage, such as tube 14 and output passage 9 of FIGURE 1. Thus, switching occurs on such devices only when the object on which the control stream nozzle is mounted approaches within a predetermined distance of the fluid switching device. Of course, the positions of the fluid switching device and nozzle may be interchanged.

Figure 10:
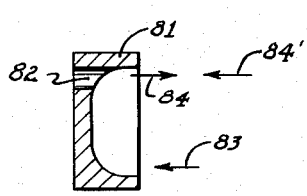
FIGURE 10 is a cross sectional view of a modification of the reflectors and diverters employed in FIGURES 7 and 8 of the accompanying drawings.

FIGURE 10 illustrates a cross section of a reflector substantialy identical with that ilustrated in FIGURE 8 except for the provision of a passage 82 therethrough. The passage 82 is tangential to the inner circumference of the curved surface forming the channel in the reflector and perpendicular to the entrance-exit plane of the channel. When fluid is applied to the receptor 81 along a path as defined by the arrow 83 then the fluid is reflected by the receptor and is emitted or egresses therefrom along the path indicated by arrow 84. In this respect, the operation of the receptor 81 in identical with the operation of the reflector 37. However, when the tote box has moved to a position such that fluid approaches the unit along the path indicated by the arrow 84', the fluid egresses from the receptor through the passage 82.

Figure 11:
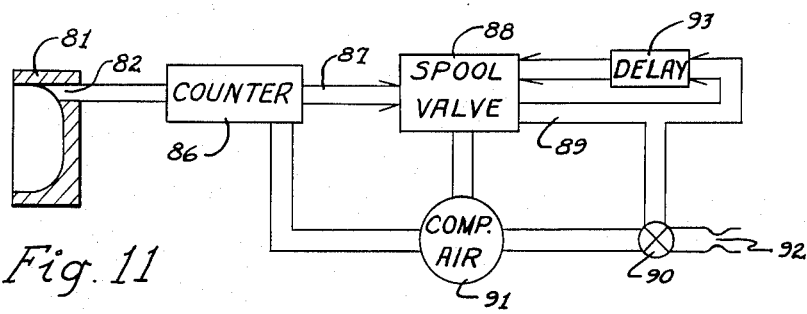
FIGURE 11 is a schematic diagram of a pneumatic system employing undiverted fluid provided by the reflector of FIGURE 10 for control functions in addition to those obtained from the diverted fluid provided by the reflector.

Referring now specifically to FIGURE 11 of the accompanying drawings, a system is illustrated utilizing the flow of air through the passage 82 of the reflector 81 to operate elements carried by the tote box. Regardless of the direction of approach of the tote box to a particular sensing station at some point in its passage past the station, air passes through the channel 82. If now this air is applied to a pure fluid system, certain operations may be controlled in accordance with, for instance, the number of times that the box passes one of these sensing stations. As an example, the air which passes through the passage 82 may be applied to a counter 86 of the type disclosed in Warren Patent No. 3,001,698. Upon the counter achieving a particular count, it provides an output signal along a passage 87 to a spool valve 88. The spool valve, upon being operated by fluid applied to the passage 87, causes fluid to be applied to a conduit 89 for operating a valve 90. The valve 90 permits fluid to flow from a pressurized fluid source 91 through the valve 90 to a nozzle 92. Fluid from the nozzle 92 may be employed to deflect the tote box thus eliminating the need for a vane type of mechanical deflector as previously described. The fluid emitted by nozzle 92 may alternatively be employed as a brake. The compressed air source 91 is employed to provide operating fluid to the counter 86 and through the spool valve 88 to the main valve 90. To insure that only a short burst or at least a controlled burst of compressed air is applied to the nozzle 92, a portion of the fluid supplied to the tube 89 is fed back through a fluid delay line 93 to the spool valve 88 so that, after a predetermined delay, the spool valve is reset. Upon resetting of the spool valve, the valve 90 is reclosed to shut off the supply of compressed fluid or air to the nozzle 92.

Figure 12:
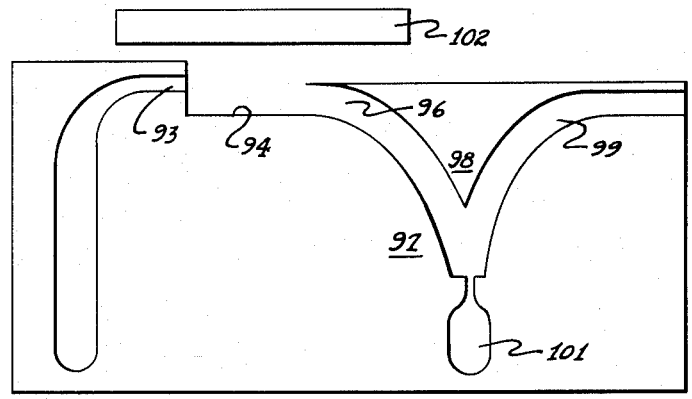
FIGURE 12 is a schematic diagram of a fluid detection system in which the object to be detected does not interrupt the fluid stream employed for object detection.

The various devices illustrated in FIGURES 1 through 11 are directed primarily to apparatus for detecting the passage of a particular device past a predetermined location. The principles employed in the system, however, are equally applicable to detection of an object within a particular region which object cannot be passed through a fluid beam because of the size, shape, lack of freedom of movement in a given environment, or various other causes. Referring now specifically to FIGURE 12 of the accompanying drawings, there is provided one embodiment of a device for detecting the presence of objects even though these objects cannot be passed or caused to move through or in front of a fluid stream. In the system of FIGURE 12, fluid from a nozzle 93 locks onto a wall 94 so as to be initially directed into a passage 96 of a fluid unistable device 97. The device 97 comprises, in addition to the passage 96, a generally V-shaped divider 98 defining in part along its left side, the channel 96 and on its right side, a second channel 99. A power nozzle 101 issues fluid under pressure towards the apex of the V-shaped divider 98. The fluid issued by the nozzle 101 normally attaches to the left sidewall of the unit, since it is closer to the nozzle 101 than the right sidewall, and flows out of the passage 96. If, however, the passage 96 is blocked by the jet from nozzle 93 then the majority of the fluid from the nozzle 101 flows out the channel 99 to a load device, flow through this channel indicating the predetermined condition which is being detected. Specifically, in the absence of an object, such as object 102, the fluid flow from the nozzle 93, which is supplied to the nozzle at a greater pressure than the fluid supplied to the nozzle 101, locks onto the wall 94 and provides a high impedance load at the output of the passage 96. The system is proportioned to permit a small flow out of the passage 96 in the presence of the stream from the nozzle 93 although the majority of the fluid issued by the nozzle 101 flows out of the passage 99.

If the object 102 is now brought downwardly, as viewed in FIGURE 12, into proximity with the nozzle 93 and obtains a position closer by a predeterminable amount to the nozzle 93 than the wall 94, the fluid stream attaches to the bottom of the object 102 and the load is removed from the channel 96. The fluid stream issued by the nozzle 101 switches to the passage 96 and is removed from the passage 99. This switching action indicates to the system to which the unit is attached that an object has come within a prescribed minimum distance of the orifice 93 and therefore provides for detection of an object in this region.

In the device of FIGURE 12, the structure defining the orifice 93 is of sufficient height to prevent the object 102 from contacting the upper horizontal surface, as viewed in FIGURE 12, of the divider 98. When the object has been brought into contact with the upper surface of the device bounding the nozzle 93, this is still ample room for the fluid stream issued by the nozzle 93 to exit over the top of the divider 98 without appreciably interfering with flow from the passage 96. If the unit is redesigned, however, as illustrated in FIGURE 13, it is possible to employ the device to detect the presence of an object within prescribed limits and if the object is outside of those limits, either too far from the device or too close to it, a different operation occurs.

Figure 13:
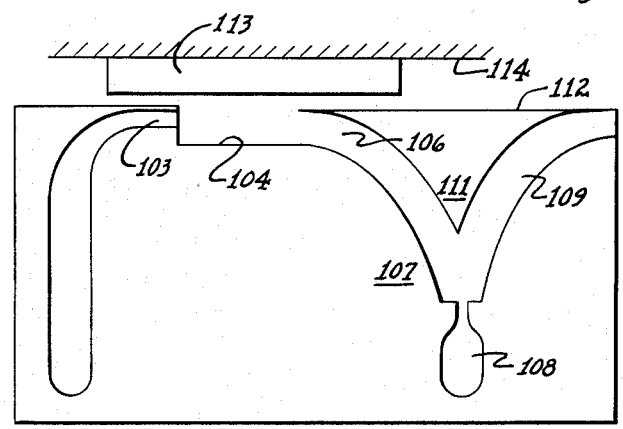
FIGURE 13 is a schematic diagram of a modification of the embodiment of FIGURE 12 employed to detect the presence of a body within prescribed minimum and maximum limits.

Referring specifically to FIGURE 13 of the accompanying drawings, fluid is again issued from nozzle 103 and normally attaches to a wall 104 so as to provide a load for output passage 106 of an analog device 107. Fluid is supplied to the passage 106 from a power nozzle 108 in the absence of fluid from nozzle 103; i.e. when flow from nozzle 103 does not try to enter passageway 106. Fluid from nozzle 108 is normally diverted to an output passage 109 of the device due to flow from nozzle 103.

The two passages 106 and 109 are defined, in part, by a generally V-shaped divider 111. The divider 111 has an upper surface 112 which forms part of a gauging surface. If an object 113 approaches sufficiently close to the upper surface 112 as illustrated in FIGURE 13, of the device, flow from the nozzle 103 attaches to the lower surface of body 113 and the fluid from the power nozzle 108 is now permitted to vent through the output passage 106. However, if the object 113 approaches quite close to the surface 112 of the divider 111, then the fluid stream issued by nozzle 103 has difficulty in exiting over the top of the divider 111 and a substantial back pressure is again built up in the region between the nozzle 103 and the outlet passage 106. The back pressure in this region again becomes sufficient to cause the stream from the nozzle 108 to switch to the output passage 109. Upon withdrawal of the body 113, the stream from nozzle 103 again locks onto wall 104 and produces deflection of the stream from nozzle 108 to channel 109.

The above system, therefore, causes fluid to be diverted to the output passage 109 when the object 113 is either too far from or too near to the horizontal upper surface 112, as viewed in FIGURE 13, of the apparatus. The device permits gauging of the size of an object by the position of the bottom surface of the object 113 relative, for instance, to a guide surface 114 or some other position fixed relative to the apparatus illustrated.

It is apparent from the above that the various embodiments of the present invention provide different types of apparatus for detection and measurement by means of pure fluid systems of physical objects without requiring the use of mechanical sensing elements, electrical sensors, photoelectric sensors, etc. Where the system eventually to be controlled is an electrical system, then subsequent conversion by pressure or hot wire or other types of transducers may be effected. If a mechanical system is to be controlled, then the output flows from the various devices may be employed to control pilot valves which in turn may control the supply of air or other fluids to larger physical units. If the device is to be employed only to provide a display of a number of objects, etc. then the output fluid flows from the apparatus may be employed directly in visual display apparatus such as disclosed in my co-pending patent application Serial No. 252,788, filed January 21, 1963.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A pure fluid detection apparatus comprising a pure fluid device including an interaction region, a power nozzle for issuing a stream of fluid into said interaction region, at least a pair of fluid passages communicating with said interaction region and having outlet ends remote from said interaction region, and means for causing at least a portion of said stream of fluid to be directed away from a first of said fluid passages; means for producing a flowing fluid stream directed against said outlet end of the other of said pair of fluid passages to vary the load thereon; and means responsive to variations in load on said outlet end of the other of said pair of fluid passages for varying as a direct function of said load the fluid flowing to said first passage.

2. The combination according to claim 1 wherein said pair of fluid passages are outlet passages of said pure fluid device.

3. The combination according to claim 1 comprising a third passage communicating with said interaction region, said first and said third passages comprising output passages of said fluid device and means for maintaining the static pressure in said interaction region above the pressure in the static ambient region communicating with said outlet end of said other of said pair of passages.

4. The combination according to claim 1 further comprising means for pressurizing said interaction region sufficiently to cause fluid to issue out of said outlet end of said other of said pair of passages over at least a prescribed range of variations of said flowing fluid stream.

5. The combination according to claim 1 wherein said pure fluid device is a bistable element and comprises means for directing all of said stream of fluid issued by said power nozzle away from said first passage in the absence of said flowing fluid stream.

6. The combination according to claim 1 wherein said means for producing is spaced sufficiently from said outlet end of said other of said fluid passages to permit an object to be detected to pass therebetween and obstruct said flowing fluid stream.

7. The combination according to claim 1 further comprising a gauging surface located to permit approach of a body of a given size sufficiently closely to said flowing fluid stream as to develop boundary layer effects between the body and the flowing fluid stream sufficient to deflect the flowing fluid stream away from said outlet end of said other of said pair of passages.

8. The combination according to claim 7 further comprising a second gauging surface spaced from said first-mentioned gauging surface, said second gauging surface located to permit said flowing fluid stream to flow between the body and said second gauging surface when the body is less than a predeterimned size and at least partially blocking said flowing fluid stream when the body is greater than the predetermined size and means for maintaining the load on said outlet end of said other of said pair of passages when said flowing fluid stream is at least partially blocked by said second gauging surface.

9. The combination according to claim 1 comprising means for developing a second stream of fluid directed to impact against said flowing fluid stream so that said second stream of fluid varies the quantity of fluid of said flowing fluid stream directed against said outlet end of said other of said pair of passages as a function of the momentum of said second stream of fluid impacting against said flowing fluid stream.

10. The combination according to claim 9 comprising a third passage communicating with said interaction region, said first and third passages comprising output passages of said devices and said other of said pair of passages comprising a control passage of said device.

11. The combination according to claim 9 further comprising means for pressurizing said interaction region sufficiently to cause fluid to issue out of said outlet end of said other of said pair of passages over at least a prescribed range of variations of said flowing fluid stream.

12. An object detection apparatus comprising a first means for issuing a stream of fluid, a second means for receiving a stream of fluid, a fluid diverter adapted to be moved relative to both said means, said fluid diverter having a surface contoured to deflect the fluid stream issued by said first means to said second means, a pure fluid amplifier comprising a pair of output channels and a power nozzle for issuing a deflectable fluid stream toward the ingress end of said output channels and means responsive to receipt of said stream of fluid by said second means to vary the relative proportions of the fluid flowing through said outlet passages.

13. The combination according to claim 12 wherein said fluid deflector includes a passage adjacent one end of said surface and parallel to the axis of the stream of fluid issued by said first means.

14. The combination according to claim 13 further comprising a receptacle adapted to be transported, a fluid-operated system mounted on said receptacle, and means responsive to flow of fluid through said passage in said fluid diverter for controlling said fluid-operated system.

15. The combination according to claim 12 further comprising a receptacle adapted to be transported by a conveyor and means for movably mounting said fluid diverter on said receptacle.

16. The combination according to claim 12 further comprising a receptacle adapted to be transported by a conveyor, a plurality of fluid diverters, means for movably mounting said diverters on said receptacle, a plurality of sensing stations past which said receptacle may be conveyed, each of said sensing stations including at least two of said first and second means, the arrangement of said first means relative to one another at each of said sensing stations being different at each of said sensing stations and corresponding to a possible arrangement of said fluid diverters relative to one another.

17. The combination according to claim 16 further comprising receptacle deflection means disposed along the path of movement of said receptacle and means responsive to all said second means at a sensing station receiving fluid concurrently for operating said receptacle deflection means.

18. The combination according to claim 12 further comprising a movable object adapted to be sensed in moving past one of several detection stations, means for movably mounting said fluid diverter on said object, a plurality of detection stations arranged along the path of said object, each of said sensing stations including at least one of said first and second means, one of said sensing stations having said first and second means oriented so that fluid issued by said first means is deflected by said fluid diverted to said second means.

References Cited by the Examiner

UNITED STATES PATENTS

| | | | |
|---|---|---|---|
| 3,001,698 | 9/1961 | Warren | 137—81.5 X |
| 3,075,548 | 1/1963 | Horton | 137—81.5 X |
| 3,107,850 | 10/1963 | Warren et al. | 137—81.5 X |
| 3,122,045 | 2/1964 | Zilberfarb. | |
| 3,159,168 | 12/1964 | Reader | 137—81.5 |

FOREIGN PATENTS 1,083,607  6/1960  Germany.

M. CARY NELSON, *Primary Examiner.*

LAVERNE D. GEIGER, *Examiner.*

S. SCOTT, *Assistant Examiner.*